Patented May 13, 1924.

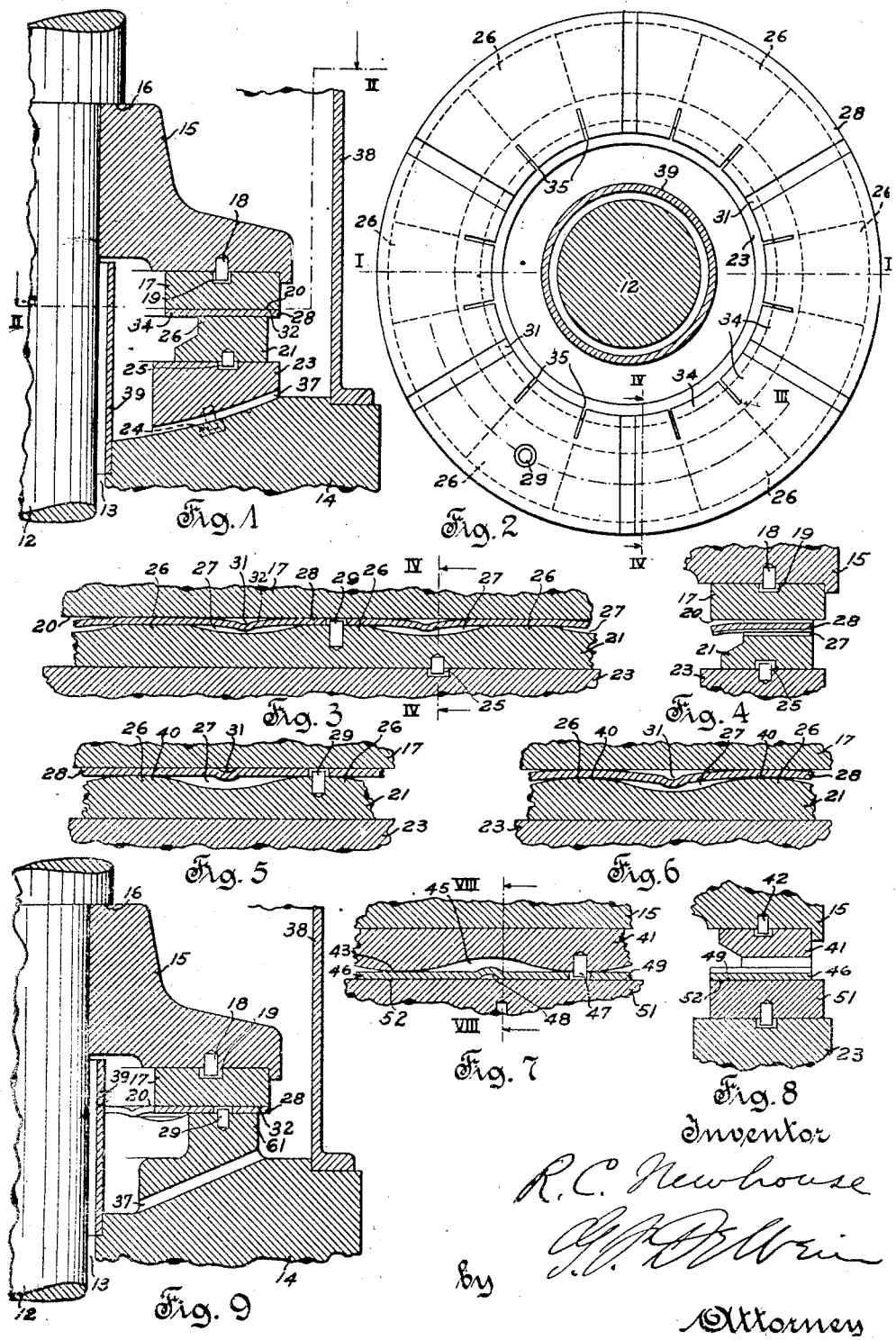

1,494,010

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

THRUST BEARING.

Application filed June 28, 1920. Serial No. 392,511.

*To all whom it may concern:*

Be it known that RAY C. NEWHOUSE, a citizen of the United States of America, residing at Wauwatosa, in the county of Milwaukee and State of Wisconsin, has invented a certain new and useful Improvement in Thrust Bearings, of which the following is a specification.

This invention relates in general to bearings and has particular relation to bearings, especially those of the thrust type, wherein special provisions are usually made for reducing friction through the production of a film of lubricating fluid under pressure between the relatively movable bearing surfaces.

It is an object of this invention to provide a thrust bearing of improved design and construction wherein desirable lubricating effects are secured through a film of oil under pressure developed and maintained between the active bearing surfaces.

It is an object of this invention to provide a thrust bearing wherein parts of the relatively movable bearing elements are of improved design and construction to facilitate the production and maintenance of a desired film of oil under pressure between the active bearing surfaces during the operation of the shaft with which the bearing is associated.

It is a further object of this invention to provide a thrust bearing of the general type described and embodying cooperative bearing elements of such improved design and construction as to contribute readily to the production and maintenance of a plurality of wedge-shaped films of oil between the active bearing surfaces of the relatively movable parts of the bearing, while, at the same time, providing that degree of strength and rigidity which insures adequate support of the shaft and parts attached thereto without undesirable distortion, when these parts are at rest.

It is a further and general object of this invention to provide an improved thrust bearing of the general type described and which is of extreme simplicity as to form and method of manufacture and of low production cost, not only as to initial cost, but more especially as to cost of renewal of the wearing parts, and which functions with great efficiency in maintaining the desired film of lubricating fluid under pressure between the active bearing surfaces of the relatively rotatable parts of the bearing.

These and other objects and advantages are attained by this invention, various novel features of which will appear from the description and drawings, disclosing one or more embodiments of said invention, and will be more particularly pointed out in the claims.

Fig. 1 is a fragmentary sectional elevation of apparatus provided with a thrust bearing embodying features of this invention, the section being along the line I—I of Fig. 2.

Fig. 2 is a sectional plan view along the line II—II of Fig. 1.

Fig. 3 is a fragmentary sectional elevation of the bearing shown in Figs. 1 and 2, the co-operative bearing elements being developed and the section being along the line III of Fig. 2, the relatively flexible bearing element being in the form it assumes during normal operation.

Fig. 4 is a fragmental elevation along the line IV—IV of Figs. 2 and 3.

Figs. 5 and 6 are enlarged sectional elevations similar to Fig. 3, showing a modified embodiment of features of the invention, Fig. 5 showing the parts with the shaft at rest, and Fig. 6 with the shaft operating under normal conditions.

Fig. 7 is a sectional elevation similar to Fig. 3, but showing another modified embodiment of features of the invention.

Fig. 8 is a sectional view on the line VIII—VIII of Fig. 7.

Fig. 9 is a view similar to Fig. 1, showing a modified embodiment of features of the invention disclosed in the latter figure.

In the embodiment of the invention disclosed in Figs. 1 to 4, inclusive, the shaft 12 may be considered as that of a vertical shaft machine of any desired character, and passes through a central opening 13 in a bearing support 14. An annular support or thrust collar 15 is secured to the shaft 12, preferably by being keyed thereto and held against a shoulder 16 thereon. The member 15 carries on its under side or is supported on an annular bearing element 17, being secured in operative relation thereto and held comparatively fixed relatively thereto, as by a dowel pin 18 secured to the collar 15 and disposed in a slot 19 in the bearing element 17. The under side of the annular bearing element 17 is machined to provide a desired annular bearing surface 20.

An annular supporting element 21 may be mounted directly upon the bearing support 14 and held against appreciable movement relatively thereto, or as shown in Fig. 1, this element 21 may be mounted in position through the intermediary of a supporting collar 23 having a spherical lower surface cooperating with a spherical seat on the bearing support 14, as indicated, a limited amount of desired relative movement being permitted and undesirable relative movement being prevented by a pin and slot arrangement indicated at 25, the surface of engagement between the elements 21 and 23 being preferably in a single plane.

Independently of whether the annular element 21 is supported directly upon the bearing support 14 or through the collar 23, the element 21 is cut away or recessed at spaced points at its upper side to provide spaced projections or pillars 26, the intermediate recesses being indicated at 27. The upper surfaces of the projections or pillars 26 are machined, so as to lie preferably in a single plane, as indicated in Fig. 3. An annular bearing element, preferably in the form of a one-piece ring of uniform width and thickness, rests upon the supporting projections 26, being held against appreciable bodily movement thereon through a pin and slot arrangement 29, indicated in Figs. 2 and 3. While this bearing element 28 may be fairly stiff, it must possess sufficient flexibility to permit some deflection thereof at the unsupported portion overlying the recesses 27. The bearing element 28 is provided with radial grooves 31, preferably pressed into the bearing face 32 of the element, without appreciable diminution of the thickness thereof. These radial grooves 31 are spaced apart a distance equal to that between the centers of the supporting projections 26, and in the operative positions of the parts, these grooves overlie the recesses 27 in the supporting element 21.

It will be noted that the supporting projections 26 do not extend across the full radial width of the bearing element 28, but terminate at a point approximately two thirds of the distance from the other periphery, this leaving an annular portion 34 at the radially inner side of the bearing element 28, this latter portion being supported only through its integral connection with the body portion of the bearing element. In view of the fact that the operating position of the bearing element 28 on its support 21 is such that the radial grooves 31 are intermediate adjacent supporting projections 26, application of considerable pressure to the upper side of the bearing element 28 at points adjacent the grooves 31 will cause deflection of the ring at these points, as indicated in Fig. 3. Likewise, the application of such pressure at the radially inner portion 34 of the bearing element 28, that is, the part not directly supported through the supporting projections 26, will cause more or less deflection of this portion of the bearing ring from the normal plane of the bearing surface thereof.

This radially inner portion of the bearing ring 28 is provided with a plurality of radial slots 35 located in substantial alinement with the radial sides of the supporting projections 26 and extending from the inner edge of the bearing element approximately through the unsupported portion 34. This arrangement permits more ready deflection of those parts of the inner portion 34 of the bearing element 28 which are adjacent the grooves 31, as indicated generally in Fig. 4.

The supporting collar 23 may be provided with substantially radial grooves 37 which will establish communication between the space outside of the bearing elements 21, 28 and 17 and the space radially within these elements.

A housing 38 is supported on the bearing support 14 in spaced relation to the active elements of the bearing. A sleeve 39 is secured to the support 14 at its inner edge about the opening 13 therein, this sleeve extending upwardly to a point beyond the active bearing surfaces of the relatively movable parts of the bearing. A chamber is thus formed between the housing 38, the sleeve 39 and the support 14, this chamber being filled with oil to a level appreciably above the active bearing surfaces of the relatively movable parts of the bearing and somewhat below the upper end of the sleeve 39. It will be apparent that circulation of oil in a radial direction is permitted through the radial slots or grooves 37 in the supporting collar 23, and the radial grooves 31 in the bearing face of the element 28.

When the shaft is at rest, it will be apparent that the bearing face of the entire bearing ring 28 is in substantially a single plane, and the weight of the shaft and its attached parts is distributed over the entire bearing surface of this bearing element, there being no appreciable tendency toward deflection of the radially inner portion 34. However, during operation, the lubricating fluid which readily enters and passes through the radial grooves 31 in the bearing element 28 has considerable pressure developed thereon due to centrifugal force acting thereon and also the circumferential swirl or drag thereon due to the rotating element of the bearing. Due to the fact that the annular bearing element 17 is comparatively rigid, and the design and construction of the bearing element 28 is such as permits deflection of parts thereof, especially those unsupported parts adjacent the radial grooves 31 and the unsupported radially inner edge portion 34, on the attainment of a sufficiently high speed, the oil pressure developed is effective to deflect portions of the bearing surface at these points and cause the formation of wedge-shaped films of oil between the active bearing surface 32 of the bearing element 28 and the bearing surface 20 of the bearing element 17. These wedge-shaped films decrease in thickness toward the supporting projections 26 of the element 21, and are appreciably thicker at the radially inner edge of the bearing surface than at the outer edge thereof, this being due to the fact that the unsupported extension 34 is purposely designed, through the provision of the radial slots dividing this portion of the bearing element into segregated bearing sections, to permit appreciable deflections thereof. As will be apparent, these wedge-shaped films of oil are radially maintained under sufficient pressure during operation of the shaft at normal speed to lift or float the movable element of the bearing on a film of oil under pressure, thus reducing or actually preventing metal to metal contact between the active bearing elements and, hence, thus greatly reducing the frictional losses.

In the modification shown in Figs. 5 and 6, all the parts of the bearing are substantially the same as those of the bearing disclosed in Figs. 1 to 4, inclusive, the only difference being that the supporting projections 26 of the supporting element 21 are rounded or crowned, as indicated at 40, so as to better facilitate the deflection and change of shape of the annular bearing element 28 under conditions of operation of the shaft at normal speed. As indicated in Fig. 5, the bearing element 28 is in its normal, unstrained or undeflected condition, such as it assumes when the shaft and bearing are at rest; while in Fig. 6, this element 28 is shown as occupying the position it assumes when the shaft and bearing are operating at normal speed.

In the modification shown in Figs. 7 and 8, the operating principle involved in the previously described bearing structure is present to substantially the same extent, but the active portions of the bearing elements are reversed in that the deflectable bearing element 28 rotates with the shaft. A supporting element 41 of substantially the same construction as the supporting element 21 of Figs. 1 to 6, inclusive, is associated with the thrust collar 15, being constrained to rotate therewith through the pin and slot arrangement indicated at 43. A bearing element 46, which may be considered as of the same form as the bearing element 28 of Figs. 1 to 6, inclusive, except reversed so as to present its bearing face downward, is associated with the supporting element 41, being forced to rotate therewith through the pin and slot arrangement indicated at 47. The radial oil grooves 48 are formed in the lower bearing surface 49 of the bearing element 46. A co-operative bearing element 51 is mounted in relatively fixed position either directly upon the bearing support 14 or through the intermediary of a spherically adjustable supporting collar 23, and has an upper bearing face 52 which co-operates with the lower bearing face 49 of the bearing element 41 in the same manner as the bearing face 20 of the relatively rigid bearing element 17 co-operates with the bearing face 32 of the bearing element 28 of Fig. 1.

During operation, the effect of oil under pressure is to deflect upwardly the portions of the bearing element 46 adjacent the radial grooves 48 therein, permitting the formation of wedge-shaped films of oil having their thicker portions opposite the grooves and tapering toward the supporting projections 43. Likewise, the unsupported radially inner portion of the bearing element 46 is deflected upward, thus further facilitating the entrance of oil under pressure between the active bearing surfaces and the formation of the desired film of oil under pressure, which lifts or floats the shaft and the bearing element associated therewith so as to prevent substantial metal to metal contact between the active bearing elements.

In the modification shown in Fig. 9, the support for the bearing element 28 is integral with the bearing support 14. As indicated, the upper portion of the bearing support 14 is recessed to provide spaced supporting shoulders or projections 61 upon the upper surface of which the bearing element 28 is mounted, the radial grooves in the bearing face of the element 28 being disposed opposite the centers of the recessed portions between the spaced projections 61. These supporting projections 61, as in Fig. 1, preferably do not extend to the radially inner edge of the bearing element 28, thus providing an unsupported portion of the bearing element, which may be recessed or slotted as indicated at 35 in Fig. 2. It will be apparent that, in operation, the action of the bearing of Fig. 9 is similar to that of the bearing of Figs. 1 to 4, inclusive. With the arrangement shown in this modification, it will be apparent that an extremely simple and efficient bearing may be produced at a minimum of cost.

Likewise, it will be apparent that the bearing structure of Figs. 7 and 8 may be modified to the extent of having the supporting member 41 for the bearing element 46 integral with the thrust collar 15. It will be apparent that such a modification will not militate against the efficiency of the bearing, for the bearing element 41 acts only as a support for the active bearing element 46. In operation, the action of this modified bearing is substantially the same as that of the bearing of Figs. 7 and 8.

It will be apparent that, due to the co-operative arrangement between the bearing support 14 with its spherical upper surface and the supporting collar 23 with its spherical lower surface, the supporting collar and the active bearing elements 28 carried thereby are free to shift to a limited extent and thus compensate for any unbalancing in the distribution of the thrust of the shaft and the rotating parts carried thereby.

While the above explanation may not be exact as to all details of physical effects attending the development and maintenance of the film of lubricating material under pressure between the active bearing surfaces of the bearing elements, nevertheless, it is certain that most desirable operating results may be secured by bearing structures embodying the present invention.

It should be understood that it is not desired that the invention claimed be limited to the exact details of construction shown and described, for obvious modifications may occur to persons skilled in the art.

It is claimed and desired to secure by Letters Patent:

1. A bearing element of substantially uniform thickness and having a bearing surface, the radially inner portion of said element being in the form of separated sections whose bearing surface is deflectable from the general plane of the bearing surface of the body portion of said element in the normal operation of said bearing element.

2. A bearing element in the form of a ring of substantially uniform thickness and having portions readily deflectable in the normal operation of said bearing element, comprising a portion of reduced bending strength at its inner periphery.

3. A thrust bearing element in the form of a one-piece ring of substantially uniform thickness and of reduced bending strength at its inner periphery, said ring having resiliently yieldable portions provided with grooves across the bearing face of the ring, said grooves having a radial directional component.

4. A thrust bearing element in the form of a one-piece ring of substantially uniform thickness and having a bearing surface provided with spaced grooves having a radial directional component, the radially inner portion of said ring being in the form of separated sections deflectable from the general plane of the body portion of said ring.

5. A thrust bearing element in the form of a one-piece ring of substantially uniform thickness and radial width, and having a bearing surface provided with spaced substantially radial grooves, said ring being appreciably resiliently yieldable in the vicinity of said grooves, and the radially inner portion of said ring having substantially radially extending slots therein to provide separated sections deflectable from the general plane of the body portion of said ring.

6. In a thrust bearing, an annular supporting element having circumferentially spaced supporting portions with intermediate recesses, and a bearing element in the form of a ring supported by the said spaced portions of said first element and having a bearing face with approximately radial grooves across said face opposite said recesses, said bearing element being resiliently yieldable in the vicinity of said grooves.

7. In a thrust bearing, an annular supporting element having circumferentially spaced supporting portions with intermediate recesses, and a bearing element in the form of a one-piece ring supported by the spaced portions of said first element and having a bearing face, a radially inward portion of said bearing element extending beyond said supporting portions and having its bearing face deflectable from its normal plane in response to the effect of oil under pressure thereon.

8. In a thrust bearing, an annular supporting element having circumferentially spaced portions with intermediate recesses, and a bearing element in the form of a one-piece ring supported by the spaced portions of said first element and having a bearing face, a radially inward portion of said bearing element extending beyond said supporting portions and having substantially radial slots therein to provide separated sections supported only through their integral connection with the body portion of said bearing element and deflectable from the normal plane of the body portion of said bearing element in response to the effect of oil under pressure thereon.

9. In a thrust bearing, an annular supporting element having circumferentially spaced supporting portions and a bearing element in the form of a one-piece ring of substantially uniform thickness supported by the spaced portions of said first element and provided with approximately radial grooves across its bearing face at points intermediate adjacent ones of said supporting portions, portions of said bearing element adjacent said radial grooves being deflectable from their normal plane in response to the effect of oil under pressure in said grooves.

10. In a thrust bearing, an annular supporting element having circumferentially spaced supporting portions, and a bearing element in the form of a one-piece ring of substantially uniform thickness mounted upon and supported by said first element and provided with approximately radial grooves at its bearing face at points intermediate adjacent ones of said supporting portions, a radially inward portion of said bearing element extending beyond and being unsupported by said supporting portions, said inwardly extending portion having substantially radially extending slots in substantially radial alinement with the circumferential sides of said supporting portions to provide separated sections supported only through their integral connection with the body portion of said bearing element, said inwardly extending portions and the portions adjacent said radial grooves being deflectable from their normal plane in response to the effect of oil under pressure thereon.

11. A bearing comprising relatively rotatable bearing elements having co-operative bearing surfaces, one of said bearing elements being in the form of a ring of substantially uniform thickness and having a plurality of active bearing sections spaced apart by substantially radial grooves across the bearing face of said element, the portions of said bearing element adjacent said grooves being yieldingly resilient, and portions of the radially inner part of said bearing element being slotted to reduce the bending strength of said part.

12. A thrust bearing, comprising relatively rotatable bearing elements having co-operative bearing surfaces, one of said bearing elements being in the form of a one-piece ring of substantially uniform thickness and having a plurality of substantially radial grooves across its bearing face, a portion of said ring at the inner periphery thereof being of reduced bending strength, and a support for said ring comprising a plurality of spaced portions supporting projections against which said ring bears, the grooved portions of said ring being disposed intermediate adjacent ones of said supporting projections, and said grooved portions and said radially inner portion of reduced bending strength being deflectable in response to oil under pressure between the co-operative bearing surfaces of said bearing elements.

13. In a thrust bearing, a supporting element having circumferentially spaced supporting portions, and a one-piece bearing element of substantially uniform thickness supported by the spaced portions of said supporting element and having a bearing surface provided with a groove extending from the radially inner side of said surface and having a substantially radial directional component, said element being appreciably yieldable in the vicinity of said groove during operation of said bearing.

14. In a thrust bearing, an annular supporting element having circumferentially spaced supporting portions with intermediate recesses, and a bearing element of substantially uniform thickness supported by the spaced portions of said first element, said bearing element comprising a portion of reduced bending strength at its inner periphery.

15. In a thrust bearing, a supporting element having circumferentially spaced supporting portions with intermediate recesses, and a flexible bearing element of substantially uniform thickness supported by the spaced portions of said first element, said bearing element having a bearing face provided with an approximately radial groove opposite an intermediate recess and being resiliently yieldable in the vicinity of said groove.

In testimony whereof, the signature of the inventor is affixed hereto.

RAY C. NEWHOUSE.